(12) United States Patent
Bach et al.

(10) Patent No.: US 12,651,936 B2
(45) Date of Patent: Jun. 9, 2026

(54) FOUR-POLE SYNCHRONOUS RELUCTANCE MOTOR

(71) Applicant: SIEMENS AKTIENGESELLSCHAFT, Munich (DE)

(72) Inventors: Regina Bach, Hendungen (DE); Johannes Schmidt, Gerbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 894 days.

(21) Appl. No.: 17/611,855

(22) PCT Filed: Apr. 3, 2020

(86) PCT No.: PCT/EP2020/059519
§ 371 (c)(1),
(2) Date: Nov. 16, 2021

(87) PCT Pub. No.: WO2020/233884
PCT Pub. Date: Nov. 26, 2020

(65) Prior Publication Data
US 2022/0200375 A1 Jun. 23, 2022

(30) Foreign Application Priority Data

May 22, 2019 (EP) ..................................... 19175978

(51) Int. Cl.
| | |
|---|---|
| *H02K 1/24* | (2006.01) |
| *H02K 19/10* | (2006.01) |
| *H02K 29/03* | (2006.01) |

(52) U.S. Cl.
CPC ........... H02K 1/246 (2013.01); H02K 19/103 (2013.01); H02K 29/03 (2013.01); *H02K 2213/03* (2013.01)

(58) Field of Classification Search
CPC ............................ H02K 1/246; H02K 19/103
(Continued)

(56) References Cited

U.S. PATENT DOCUMENTS

| | | | |
|---|---|---|---|
| 5,818,140 A | 10/1998 | Vagati | |
| 6,239,526 B1 | 5/2001 | Oh et al. | |

(Continued)

FOREIGN PATENT DOCUMENTS

| | | | |
|---|---|---|---|
| CN | 1289166 A | 3/2001 | ............... H02K 1/22 |
| CN | 102349220 A | 2/2012 | ............. H02K 19/10 |

(Continued)

OTHER PUBLICATIONS

Palmieri Marco et al: "Effect of the numbers of slots and barriers on the optimal design of synchronous reluctance machines", 2014 International Conference on Optimization of Electrical and Electronic Equipment (OPTIM), IEEE, pp. 260-267, XP032615779, DOI: 10,1109/OPTIM.2014.6850947; [gefunden am Jul. 9, 2014]; ps. 265, left column, line 10-54; Figures 6-10; 2014.

(Continued)

*Primary Examiner* — Alexander Talpalatski
(74) *Attorney, Agent, or Firm* — Henry M. Feiereisen LLC

(57) ABSTRACT

A synchronous reluctance motor, in particular a four-pole synchronous reluctance motor includes a stator with 48 stator grooves for receiving a winding system; a reluctance rotor, which is spaced apart from the stator by an air gap. The reluctance rotor has axes with a high magnetic conductivity (d-axis) and axes with low magnetic conductivity (q-axis). Provision is made for an arrangement of magnetically conductive flux-conducting portions and magnetic flux barriers, which are arranged such as to form the d-axis and the q-axis of the reluctance rotor. The reluctance rotor has a geometric (Continued)

groove separation angle of αr 6° or 10°, which angle is between two adjacent magnetic flux barriers at the air gap.

5 Claims, 4 Drawing Sheets

(58) Field of Classification Search
   USPC ......................................................... 310/168
   See application file for complete search history.

(56)                References Cited

U.S. PATENT DOCUMENTS

| | | | | |
|---|---|---|---|---|
| 10,447,097 | B2 * | 10/2019 | Büttner | .................... B32B 15/04 |
| 10,707,733 | B2 * | 7/2020 | Filipeti | ................ H02K 19/103 |
| 10,742,080 | B2 * | 8/2020 | Hsu | ........................... H02K 3/12 |
| 10,910,893 | B2 * | 2/2021 | Kolehmainen | ........ H02K 17/16 |
| 2001/0026108 | A1 * | 10/2001 | Tajima | ................... H02K 1/246 |
| | | | | 310/156.01 |
| 2012/0062053 | A1 | 3/2012 | Moghaddam | |
| 2012/0062063 | A1 | 3/2012 | Moghaddam | |
| 2014/0191628 | A1 * | 7/2014 | Nakano | ................ H02K 1/2746 |
| | | | | 310/68 B |
| 2015/0280498 | A1 | 10/2015 | Kolehmainen | |
| 2017/0019006 | A1 | 1/2017 | Misu et al. | |
| 2017/0110943 | A1 * | 4/2017 | Tong | ...................... H02K 1/246 |
| 2017/0179801 | A1 | 6/2017 | Ballweg et al. | |
| 2018/0159387 | A1 | 6/2018 | Boisson et al. | |
| 2019/0027997 | A1 | 1/2019 | Zeichfüssl | |

FOREIGN PATENT DOCUMENTS

| | | | | |
|---|---|---|---|---|
| CN | 105958788 | A | 9/2016 | ............. H02K 29/03 |
| CN | 106104988 | A | 11/2016 | ............. H02K 19/10 |
| CN | 106134040 | A | 11/2016 | ............. H02K 1/24 |
| CN | 108104988 | A | 11/2016 | |
| CN | 107925283 | A | 4/2018 | |
| EP | 2 744 076 | A1 | 6/2014 | |
| JP | 2001136717 | A | 5/2001 | ............. H02K 19/10 |
| JP | 2009077458 | A | 4/2009 | ............. H02K 1/22 |
| JP | 4588255 | B2 | 11/2010 | |
| WO | WO 2018-188764 | A1 | 12/2016 | |
| WO | WO-2017121511 | A1 * | 7/2017 | ............. B32B 15/04 |
| WO | WO 2019/082518 | A1 | 5/2019 | ............. H02K 19/10 |

OTHER PUBLICATIONS

PCT International Search Report and Written Opinion of International Searching Authority mailed Aug. 6, 2020 corresponding to PCT International Application No. PCT/EP2020/059519 filed Mar. 4, 2020.

Dong Yan et al; "Rotor Optimal Design of the Gradiant Flux-Barrier for Torque Ripple Reduction in Synchronous Reluctance Motor"; vol. 32; Bo. 19; published: Oct. 10, 2017.

Transactions of China Electrotechnical Society vol. 32; Bo. 19; published: Oct. 2017, Sep. 25, 2016, Dong Yan et al "Rotor Optimal Design of the Gradient Flux-Barrier for Torque Ripple Reduction in Synchronous Reluctance Motor," pp. 21-31.

2014 International Conference on Optimization of Electrical and Electronic Equipment (Optim), IEEE, Jul. 9, 2014, Palmieri Marco et al: "Effect of the numbers of slots and barriers on the optimal design of synchronous reluctance machines," pp. 260-267.

* cited by examiner

FOUR-POLE SYNCHRONOUS RELUCTANCE MOTOR

The invention relates to a four-pole synchronous reluctance motor.

In the case of synchronous reluctance motors, reluctance rotor laminations having corresponding recesses are used. Strip-shaped lamination sections that are used as flux guiding sections are provided by stamping out and said strip-shaped sections guide the magnetic flux in the manner that is required for the provision of the required reluctance of the rotor. A magnetic regions that are provided by stamping out are located radially between the individual flux guiding sections and said a magnetic regions are provided with air or magnetically poorly conductive material, in other words said a magnetic regions act as magnetic flux blockers. A high torque yield is provided by the strip-shaped flux guiding sections. The magnetic permeability of the laminated stack is relatively small in the direction of the q-axis, in other words the magnetic blocking direction owing to the non-magnetic regions. The strip-shaped flux guiding sections extend in a transverse manner with respect to the q-axis and connect adjacent poles of the rotor in the circumferential direction and said poles are arranged in each case on d-axes (magnetic preferred directions).

Thus, the d-axis having a flux guiding section from the inner diameter to the outer diameter is formed continuously from lamination while the q axis is interrupted by flux blockers.

A synchronous reluctance motor of this type is known from the document U.S. Pat. No. 5,818,140 A1 wherein possibilities for reducing the torque ripple are already presented therein. The measures presented therein reduce the torque ripple to a certain percentage as well as the noise and oscillation behavior in comparison to a synchronous reluctance motor having an identical or approximately identical number of slot divisions of stator and rotor, hi other words Ns=Nr.

Based on this, the object of the invention is to improve a four-pole synchronous reluctance motor to such an extent that the torque ripple is further reduced without reducing the net torque.

The solution to the proposed object is provided by a synchronous reluctance motor, in particular a four-pole synchronous reluctance motor having a stator having 48 stator slots for receiving a winding system, a reluctance rotor that is spaced from the stator by an air gap, wherein the reluctance rotor has axes having a high magnetic conductivity (d-axis) and axes having a low magnetic conductivity (q-axis), an arrangement of magnetically conductive flux guiding sections and magnetic flux blockers that form d- and q-axes of the reluctance rotor by a corresponding arrangement, a geometric slot dividing angle of the reluctance rotor of $\alpha r=6°$ that is between two adjacent magnetic flux blockers on the air gap.

The solution to the proposed object is likewise provided by a synchronous reluctance motor, in particular four-pole synchronous reluctance motor having a stator having 48 stator slots for receiving a winding system, a reluctance rotor that is spaced from the stator by an air gap, wherein the reluctance rotor has axes having a high magnetic conductivity (d axis) and axes having low magnetic conductivity (q axis), an arrangement of magnetically conductive flux conducting sections and magnetic flux blockers that form d- and q-axes of the reluctance rotor by a corresponding arrangement, a geometric slot division angle of the reluctance rotor of $\alpha r=10°$ that is between two adjacent magnetic flux blockers on the air gap.

In accordance with the invention henceforth the number of flux barriers is advantageously maximized in dependence upon the selected number of rotor slots or the slot division angle $\alpha r$. As a consequence, the torque density and also the average torque of the machine are increased. The number of flux barriers is limited by the selected slot division angle or the number of rotor slots as well as by the delicate structures and thereby ultimately also delimited upwards by the axis height.

A flux barrier is accordingly a connecting piece that provides on the end a flux blocker in the region of the air gap of the dynamoelectric machine.

Owing to the embodiment in accordance with the invention of the reluctance rotor with regard to the stator, henceforth oscillating torques are significantly reduced with ordinal numbers of the stator slots and also the multiples of said stator slots. Furthermore, in this case the torque ripple is minimized. The average torque is thereby increased and the power of the reluctance motor increases. In particular, it is henceforth no longer required to incline the reluctance motor, on the stator and/or rotor side by a predetermined incline angle which however can nevertheless optionally be provided in order to further reduce the torque ripple.

In order also in the case of comparatively high rotational speeds to obtain a sufficient rigidity of the reluctance rotor with regard to centrifugal forces, connecting pieces on the radial outer edge of the rotor of the flux blockers form a circumferential continuous connecting ring.

This connecting ring can be of another material or also only part of the lamination—in other words as a single piece, and consequently can only be formed on the lamination by the stamping out procedure.

The individual flux barriers can consequently have a radially larger or smaller thickness depending upon the circumferential position.

For example, the flux blockers in the region of the d-axis can be embodied as radially thinner than in the region of the q axis.

The invention and also further advantageous embodiments of the invention are further explained with reference to exemplary illustrated exemplary embodiments. In the drawings.

Figure 1:
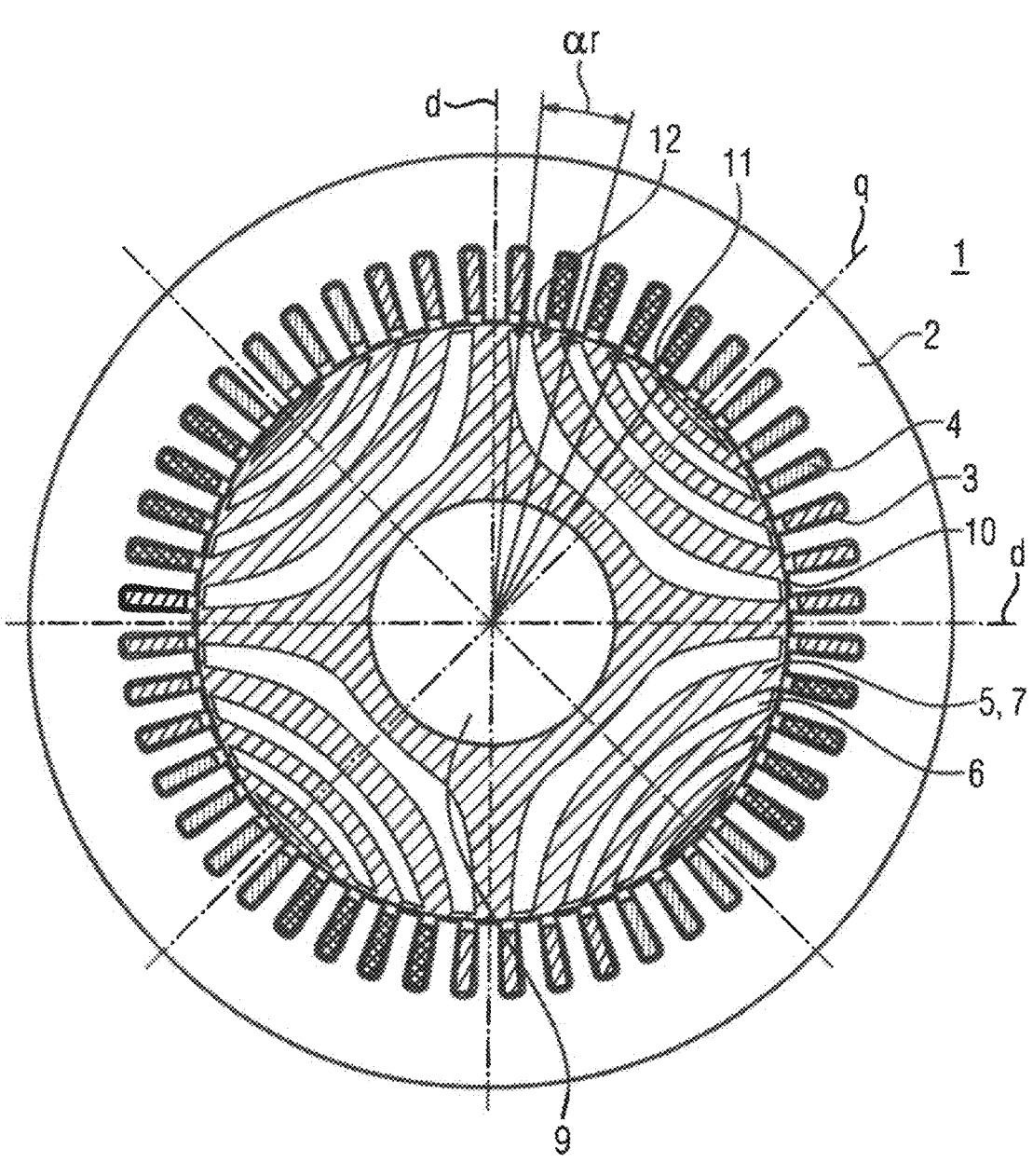
FIG. 1 shows a reluctance motor having a slot division.

A reluctance motor 1 has a stator 2 having stator slots 3 and a winding system 8 is positioned in said stator slots. The winding system 8 can be embodied both as a single layer as well as a dual layer winding. In particular, in the case of dual layer windings the windings are embodied in a stringed manner that is preferably constructed from stringed coils. A three-stranded winding system is advantageously accommodated in the stator slots 3. A reluctance rotor 5 that is embodied in a four-pole manner is arranged spaced from the inner hole of the stator 2 by an air gap 10.

For example, strip-shaped lamination sections that are used as flux guiding sections 7 are provided by stamping out predetermined laminations and said lamination sections guide the magnetic flux in the manner that is required for the provision of the required reluctance of the reluctance rotor 5. A magnetic regions are located radially between the individual flux guiding sections 7 and said a magnetic regions are provided by stamping out and are provided with air or magnetically poorly conductive material, in other words said a magnetic regions act as magnetic flux blockers 6. A high torque yield is provided by the strip-shaped and arch-shaped flux guiding sections 7. The magnetic permeability of the laminated stack that is formed from the axially stacked laminations is relatively small in the direction of the q-axis, in other words the magnetic blocking direction owing to the non-magnetic regions.

The strip-shaped flux guiding sections 7 extend in a transverse manner, in particular in a perpendicular manner, with respect to the q-axis and connect adjacent poles of the reluctance rotor 5 in the circumferential direction, wherein the poles are arranged in each case on d-axes (magnetic preferred directions).

The recesses that are used as flux blockers 6 extend in an essentially arch-shaped manner from one pole to the adjacent pole. Furthermore, said flux blockers are essentially strip-shaped.

For stability reasons, the flux blockers 6 can be interrupted by radially extending or oriented stabilizing connecting pieces 15. The physical position of said stabilizing connecting pieces within a flux blocker 6 is inconsequential from a magnetic point of view. The illustrated width of the stabilizing connecting pieces 15 for graphical reasons is larger than the actual size.

When viewed in the radial direction, consequently furthermore likewise strip-shaped, arch-shaped flux guiding sections 7 are provided between the arch-shaped, strip-shaped recesses, in other words the flux blockers 6.

The arch-shaped, non-magnetic recesses between adjacent poles extend in a transverse manner, in particular in a perpendicular manner, with respect to the q-axes that lie in a bisecting line of an angle between the d-axes. A flux blocker arrangement is therefore provided on the q-axes.

Figure 2:
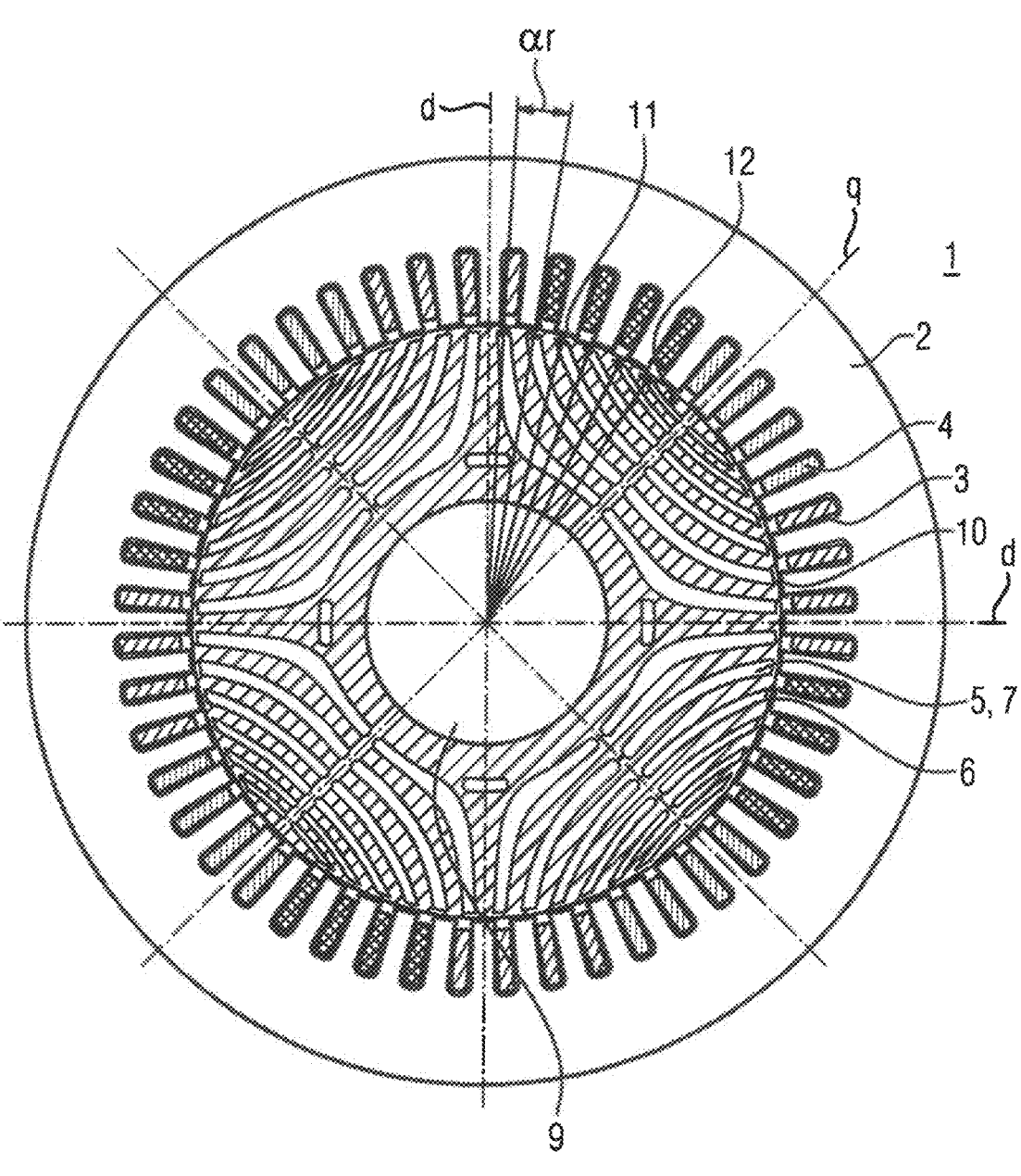
FIG. 2, FIG. 3 show reluctance motors having in each case a different slot division.
Figure 3:
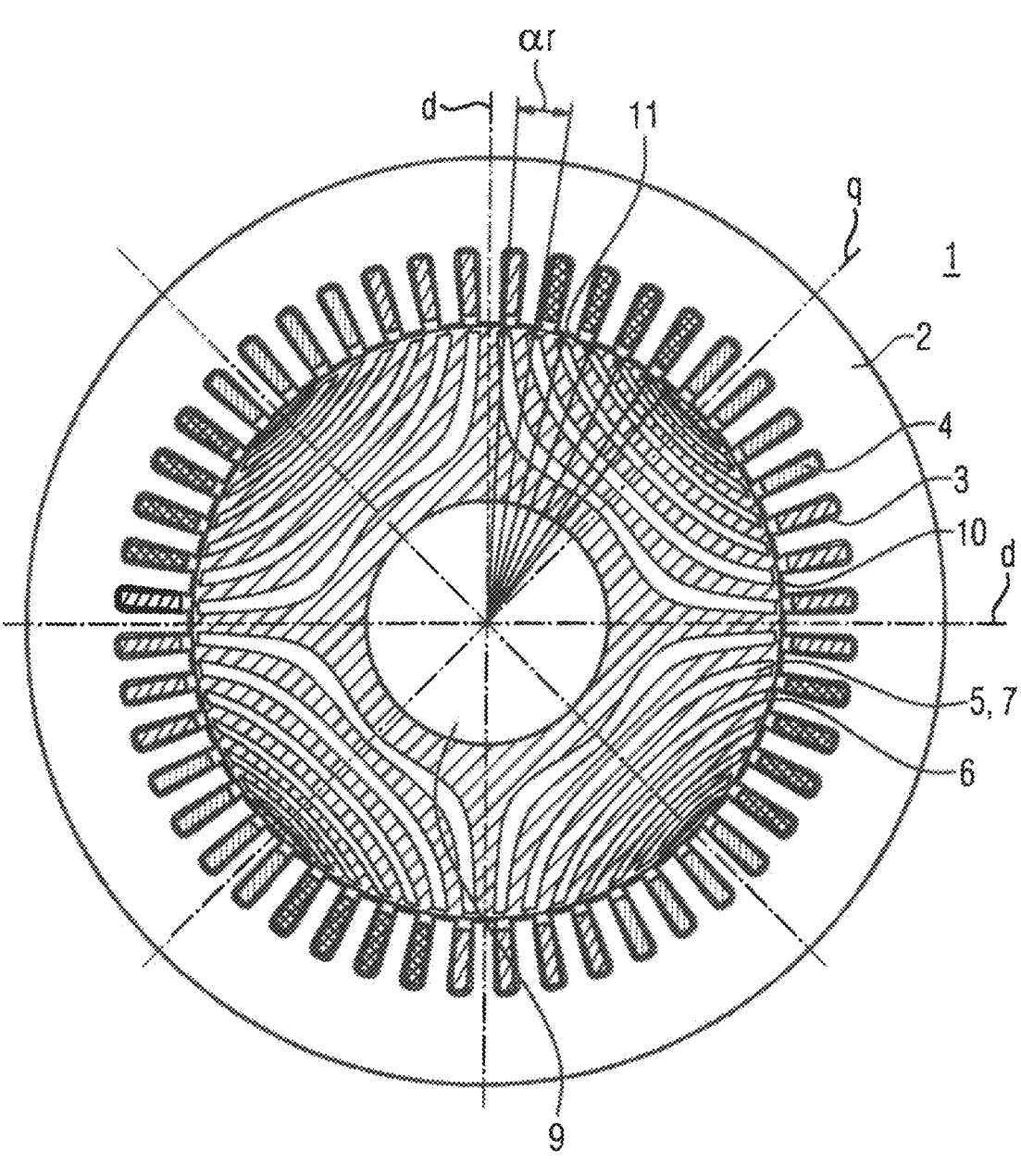

The cross sections of a reluctance motor 1 having possible reluctance rotor laminations illustrated in FIGS. 1 to 3 are for a four-pole reluctance rotor 5. Accordingly, the reluctance rotor lamination has two d-axes that are perpendicular to one another, that represent the magnetic preferred directions and that comprise in each case d-axis halves that are separated by the center of the reluctance rotor lamination.

The d-axes and q-axes of the reluctance rotor 5 are consequently formed by flux blockers 6 and magnetically conductive flux guiding sections 7. The flux blockers 6 are spaced from the air gap 10 by connecting pieces or flux barriers 11, 12 in the region of the air gap 10 of the dynamo electric machine or the reluctance motor 1 and said flux blockers form a circumferentially continuous connecting ring. For mechanical strength reasons, this is necessary in particular at high rotational speeds of the reluctance motor 1. Predetermined slot division angles αr of the reluctance rotor 5 are between these flux barriers 11, 12 in other words the real flux barriers 11 and the virtual flux barriers 12 (in accordance with FIG. 2).

FIG. 1 illustrates a slot division angle αr of approximately 10° geometrically having 32 flux barriers 11 that are arranged circumferentially.

The number of slots of the stator 2 is 48 and the number of slots of the reluctance rotor 5 is 36.

Wherein inter glia depending upon production or construction the slot division angle αr can be provided with a tolerance of up to ±0.3°.

FIGS. 2 and 3 illustrate the slot division angle of in each case approximately 6" geometrically having 56 flux barriers 11 that are arranged circumferentially. In FIG. 2, in this case 48 real flux barriers and eight flux barriers that are embodied virtually are provided. In FIG. 3, 56 real flux barriers 11 are provided. The number of slots of the stator 2 is 48 and the number of slots of the reluctance rotor 5 is 60 hi the case of these embodiments.

Wherein inter alia depending upon production or construction the slot division angle αr in FIGS. 2 and 3 can be provided with a tolerance of up to ±0.5°.

A shaft and thereby the reluctance rotor 5 that is connected to said shaft in a non-rotatable manner is then rotatably mounted about a rotational axis so that the reluctance rotor 5 in a stator 2 of the reluctance motor 1 can perform a rotation about the rotational axis.

The reluctance rotor 5 has the laminated stack as a magnetically active part and said laminated stack is formed from multiple layers or laminations that in each case have a magnetically soft, in particular ferromagnetic, material. These layers moreover have electrically insulating part layers in order to prevent eddy currents in the laminated stack during operation of the reluctance motor 1.

The rotor laminations are arranged axially aligned one behind the other in the laminated stack so that the recesses and accordingly also the flux guiding sections 7 align axially. It is preferred that consequently an incline of the stator 2 and/or the reluctance rotor 5 is not required in order to provide a maximum torque that has a comparatively low torque ripple.

However in order to further reduce the torque ripple of the reluctance motor, when viewed in the axial direction the rotor laminations can furthermore be arranged at an incline or staggered.

The rotor laminations of the layers can all have the identical cross-sectional shape, which for example simplifies a stamping process during production of the rotor laminated stack of the reluctance rotor 5.

So that the reluctance rotor 5 is closed on the outer circumference, each rotor lamination comprises on its outer edge a closed connecting ring. Said closed connecting ring thereby also fixes the flux guiding sections 7 and the flux blockers 6. The connecting ring when viewed in the circumferential direction has a sequence of connecting pieces or flux barriers.

These connecting pieces can be formed as a single piece with the respective rotor lamination during a stamping process. The connecting ring can however alternatively or in addition also be provided as a dedicated component that is attached where applicable retrospectively to the rotor laminated stack.

Figure 4:
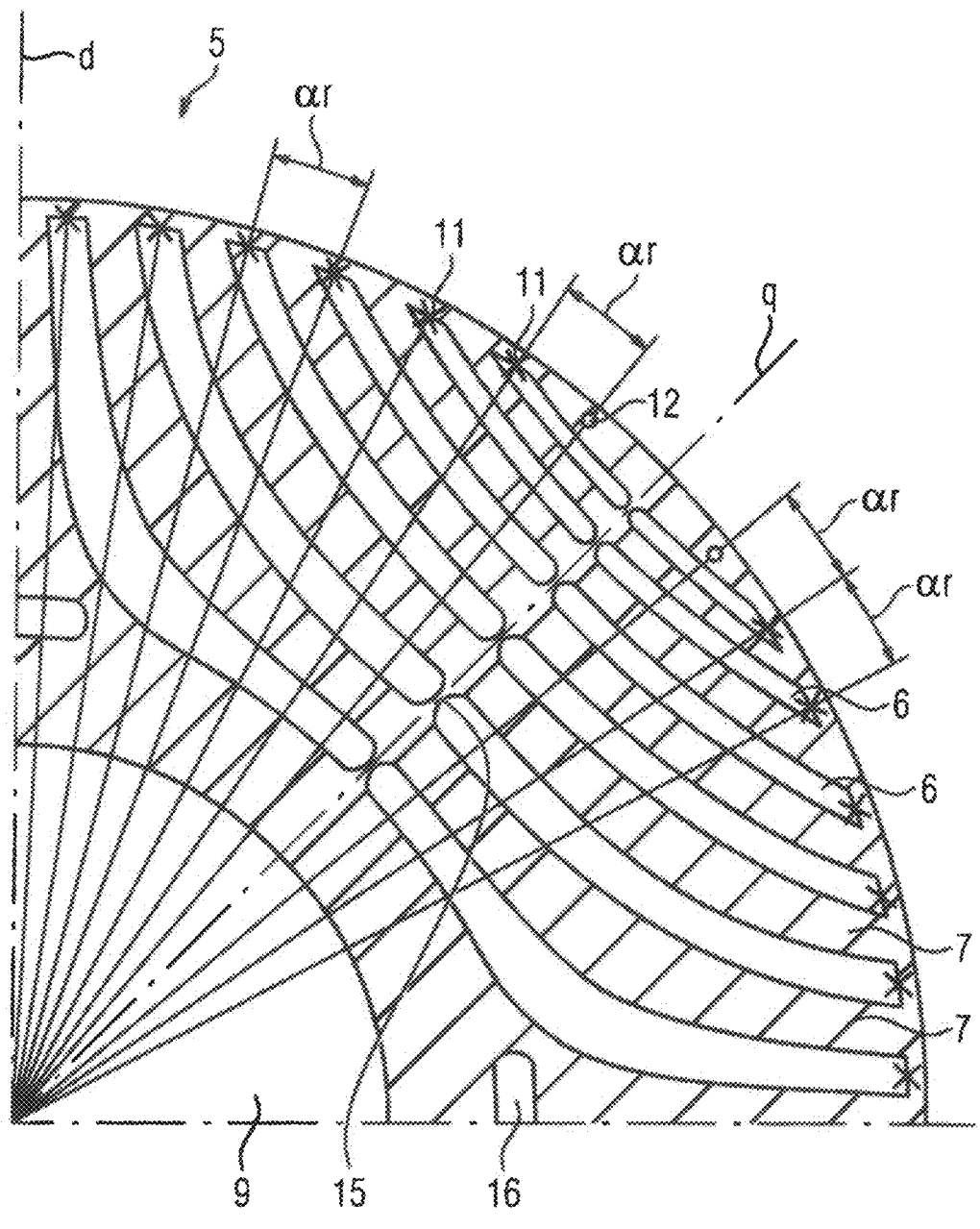
FIG. 4 shows a detailed representation of a reluctance rotor.

FIG. 4 illustrates in a general and not to scale manner the real and virtual flux barriers 11, 12 that are spaced from one another in the circumferential direction by a slot division angle αr of in each case approximately 6°. These virtual flux barriers 12 are not physically or really provided but are taken into consideration in the evaluation of the slot division. In the present case, the flux barriers 12 are virtual since the radially outermost flux blocker should theoretically be divided into two radially particularly thin flux blockers. The production of delicate structures of this type by means of stamping tools is not possible or only possible with great difficulty depending upon the axis height of the reluctance rotor 5.

The real flux barriers 11 form a closure of a flux blocker 6 with respect to the air gap 10. This design of the flux barrier 11 can be formed with approximately straight parallel edges or with arch-shaped edges. This depends inter glia on the production possibilities and/or the strength requirements of the rotor lamination.

The design in accordance with the invention of the reluctance rotor 5 can be applied to synchronous reluctance motors 1 without permanent magnets, as well as to synchronous reluctance motors 1 whose rotors have permanent magnets. In this case, permanent magnets are inserted into the flux blockers 6 in a predetermined number and/or position.

Reluctance motors 1 of this type are in particular used in the case of machine tools as main drives or servo drives. Applications in the case of compressors, pumps or fans are likewise conceivable. Further industrial areas of application are for example extruders or film blowing machines. These reluctance motors 1 can also be used in the food industry.

Reluctance motors 1 of this type are also used in drives in automotive technology, for example in the case of mining trucks, electric buses, construction machines and also in the case of vehicles underground,

The invention claimed is:

1. A four-pole synchronous reluctance motor, comprising:
a stator having 48 stator slots for receiving a winding system;
a reluctance rotor spaced from the stator by an air gap and including a laminated stack as a magnetically active part, said laminated stack being formed from multiple layers or laminations that each have a magnetically soft material, the layers having electrically insulating part layers and being arranged axially aligned, said reluctance rotor having axes of a high magnetic conductivity (d-axis) and axes of low magnetic conductivity (q-axis);
an arrangement of magnetically conductive flux guiding sections and magnetic flux blockers arranged such as to form the d-axis and the q-axis of the reluctance rotor, with the reluctance rotor having a geometric slot dividing angle of αr=6° between two adjacent ones of the magnetic flux blockers on the air gap, said flux blockers being embodied in a region of the q-axis either with radially extending stabilizing connecting pieces or without stabilizing connecting pieces; and
a number of flux barriers maximized in dependence upon a selected number of rotor slots or the slot division angle, each said flux barrier being a connecting piece located on an end of an associated one of the flux blockers in a region of the air gap, wherein the flux barriers in a region of the d-axis are embodied as radially thinner than in a region of the q axis,
wherein the reluctance rotor is configured in the absence of any permanent magnets.

2. The four-pole synchronous reluctance motor of claim 1, wherein the magnetically soft material is ferromagnetic.

3. The four-pole synchronous reluctance motor of claim 1, wherein both the stator as well as the reluctance rotor are not embodied in an inclined manner.

4. A four-pole synchronous reluctance motor, comprising:
a stator having 48 stator slots for receiving a winding system;
a reluctance rotor spaced from the stator by an air gap and including a laminated stack as a magnetically active part, said laminated stack being formed from multiple layers or laminations that each have a magnetically soft material, the layers having electrically insulating part layers and being arranged axially aligned, said reluctance rotor having axes of a high magnetic conductivity (d-axis) and axes of low magnetic conductivity (q-axis);
an arrangement of magnetically conductive flux guiding sections and magnetic flux blockers arranged such as to form the d-axis and the q-axis of the reluctance rotor, with the reluctance rotor having a geometric slot dividing angle of αr=10° between two adjacent ones of the magnetic flux blockers on the air gap, said flux blockers being embodied in a region of the q-axis either with radially extending stabilizing connecting pieces or without stabilizing connecting pieces; and
a number of flux barriers maximized in dependence upon a selected number of rotor slots or the slot division angle, each said flux barrier being a connecting piece located on an end of an associated one of the flux blockers in a region of the air gap, wherein the flux barriers in a region of the d-axis are embodied as radially thinner than in a region of the q axis,
wherein the reluctance rotor is configured in the absence of any permanent magnets.

5. The four-pole synchronous reluctance motor of claim 4, wherein the magnetically soft material is ferromagnetic.

* * * * *